United States Patent

[11] 3,574,453

[72] Inventor Teruei Hara
 Ohmiya-shi, Japan
[21] Appl. No. 715,322
[22] Filed Mar. 22, 1968
[45] Patented Apr. 13, 1971
[73] Assignee Fuji Shashin Koki Kabushiki Kaisha
 Ohmiya-shi. Saitama-ken, Japan
[32] Priority Mar. 28, 1967
[33] Japan
[31] 42/25102

[54] RETRACTABLE MIRROR MEANS FOR CARTRIDGE-TYPE MOTION-PICTURE PROJECTOR
2 Claims, 2 Drawing Figs.
[52] U.S. Cl. .................................................. 352/72
[51] Int. Cl. .................................................. G03b 23/02
[50] Field of Search ........................................ 352/72, 73, 74, 78, 159, 14; 242/197, 199

[56] References Cited
UNITED STATES PATENTS
3,300,270 1/1967 Finnerty ...................... 352/72X
FOREIGN PATENTS
778,497 12/1934 France ...................... 352/72

Primary Examiner—John M. Horan
Assistant Examiner—Monroe H. Hayes
Attorneys—Ralph E. Bucknam, Jesse D. Reingold, Robert R. Strack and Henry A. Marzullo, Jr.

ABSTRACT: A cartridge-type motion-picture projector comprises a frame and a film cartridge supporting plate mounted on the frame and movable in a fore-and-aft direction. Light from a light source enters the projector in a direction transversely thereof and is reflected by a mirror which is retracted when the cartridge supporting plate is in a forward position and projected into an operative position when the cartridge supporting plate is in a backward position.

PATENTED APR 13 1971 3,574,453

INVENTOR.
TERUEI HARA
BY Henry A. Marzullo Jr.
ATTORNEY

RETRACTABLE MIRROR MEANS FOR CARTRIDGE-TYPE MOTION-PICTURE PROJECTOR

BACKGROUND OF THE INVENTION

The present invention relates to a motion-picture projector and more particularly to a cartridge-type motion-picture projector.

It has been known that handling of a motion-picture camera or projector can be made extremely simple by loading a film therein by containing said film in a cartridge. However, in a motion-picture projector, it is essential to form a loop of film above and below a film gate in order to obtain stability in the projected image. For this purpose, a motion-picture projector has been proposed which comprises a base plate and cartridge supporting plate mounted on said base plate in such a manner that it is movable in a fore-and-aft direction and provided with means by which film loops are formed automatically upon shifting said cartridge supporting plate to a forward position after mounting a film loaded cartridge on said supporting plate in its backward position. With the motion-picture projector of the type described, however, a light source cannot be positioned rearwardly of the film gate as in conventional projectors, because the film cartridge is located in rear of said film gate. Thus, it becomes necessary to arrange the light source on either side of the projector and provide a mirror in rear of the film gate so as to reflect the light from the light source thereon directing it toward the film gate.

It is, therefore, an object of the present invention to provide mirror means which is adapted for use in a motion-picture projector of the type described above and which is operative in such a way that it is retracted when the film cartridge supporting plate is in the forward position and projected into an operative position automatically when said cartridge supporting plate is in the backward position.

It is another object of the present invention to provide a cartridge-type motion-picture projector which is compact in size and easy in handling.

SUMMARY OF THE INVENTION

According to the present invention, there is provided a cartridge-type motion-picture projector comprising a frame, a cartridge supporting plate mounted on said frame and movable between a forward nonoperative position and backward operative position, a film gate, a light source to project a light rearwardly transversely of said film gate, and mirror means disposed rearwardly of said film gate for directing the light from said light source toward said film gate by reflecting it thereon, said mirror means including a mirror operative in such a way that it is retracted when said cartridge supporting plate is in the forward nonoperative position and projected into an operative position for reflecting the light from said light source thereon to direct it toward said film gate when said cartridge supporting plate is shifted into the backward operative position.

The mirror may be connected to the frame so as to be pivotable between a retracted position and projected position, and it is possible to arrange such that said mirror is constantly urged toward the projected position under the action of spring means. Preferably, a stop lug is formed on the film gate plate to define the operative position of the mirror. The cartridge supporting plate is arranged such that it engages the backside of the mirror at its leading edge to move said mirror into the nonoperative position during its movement into the forward position.

Other features and advantages of the present invention will become apparent from the following detailed description of a preferred embodiment of the invention when taken in conjunction with the accompanying drawings.

DESCRIPTION OF THE PREFERRED EMBODIMENT

Figure 1:
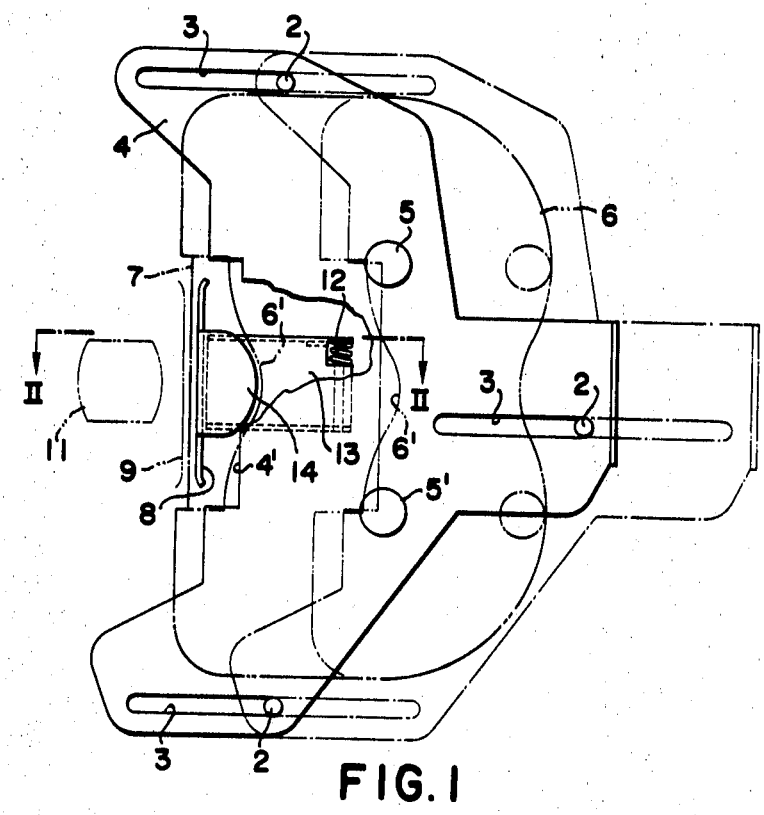
FIG. 1 is a diagrammatic view showing the critical portion of an embodiment of the present invention and FIG. 2 is a cross-sectional view taken on the line II–II of FIG. 1.
Figure 2:
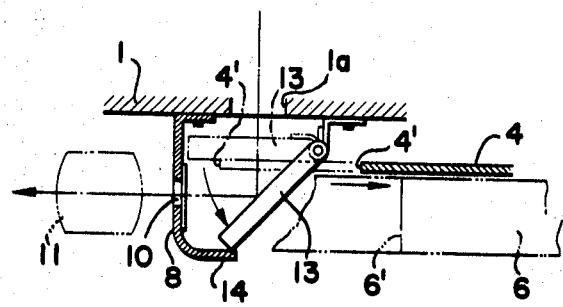

Referring to the drawings, a motion-picture projector in which the principle of the present invention is embodied, includes a base plate 1 constituting a part of a frame and a movable cartridge supporting plate 4 mounted on said base plate 1 through the engagement of slots 3 with respective three pins 2 on said base plate so as to be movable in a fore-and-aft direction. The cartridge supporting plate 4 has a pair of vertically spaced shafts 5, 5' rotatably mounted thereon. These shafts 5, 5' are engageable with a film supply core and a film take up core of a film cartridge 6 respectively to drive the same. The base plate 1 further has a film gate plate 8 fixed thereon. A film 7 drawn out from the cartridge 6 passes along the front side of the gate plate 8. As shown in FIG. 2, the gate plate 8 has an aperture opening 10 therein, and a pressing plate 9 is provided as indicated by the imaginary line in FIG. 1 to press the film 7 on the gate plate 8. The solid line in FIG. 1 shows the base plate 1 in a forward nonoperative position, and the film cartridge 6 is mounted on the base plate 1 in this position. After mounting the film cartridge, the cartridge supporting plate 4 is moved to a backward operative position indicated by the chain line in FIG. 1 and thereby a loop of film is formed above and below the gate plate 8 respectively to stabilize the projected images. With this step, the preparation for projection is completed.

In this type of motion-picture projector, it is impossible to project a light through the aperture opening 10 in the film gate plate 8 from the backside of said film gate plate as in the conventional projectors since the film cartridge 6 is position in rear of the film gate plate 8. Thus, it becomes necessary to project the light from one side of the projector and reflect the same at a point rearwardly of the film gate plate so that the light may be projected on a screen (not shown) through the aperture opening 10 in said film gate plate. The present invention proposes a motion-picture projector of the type described, which is provided therein with mirror means including a mirror to effect reflection of the light, said mirror being so arranged that it is retracted when the cartridge supporting plate 4 is in the forward nonoperative position and projected automatically into an operative position when said cartridge supporting plate 4 has been shifted into the backward operative position.

Referring again to the drawings, the base plate 1 is formed at a location slightly rearwardly of the gate plate 8 with an aperture 1a for the passage therethrough of the light from a light source (not shown) positioned on one side of the projector. Further, a mirror 13 is disposed rearwardly of the gate plate 8 for reflecting the light, passing through the aperture 1a, toward the aperture opening 10 in said gate plate. This mirror 13 is supported on the base plate 1 for pivotal movement about a vertical pin from an operative position indicated by the solid line to a nonoperative position indicated by the broken line in FIG. 2 or vice versa, and is normally urged into the operative position by a torsion spring 12. A stop lug 14 is formed on an edge of the gate plate 8, by which the mirror 13 is held in the operative position. As the cartridge supporting plate 4 moves from the backward operative position to the forward nonoperative position, the leading edge thereof engages the backside of the mirror 13, bringing said mirror into the nonoperative position indicated by the imaginary line in FIG. 2. In the drawings, reference numeral 11 denotes a focusing lens of the projector.

According to the present invention constructed as described above, therefore, when the cartridge supporting plate 4 is moved from the forward nonoperative position to the backward operative position after mounting the cartridge 6 in the forward operative position of said supporting plate, the mirror 13 is automatically projected into the light path to reflect the light from the light source and direct it toward the aperture opening 10 in the gate plate 8. Thus, it will be appreciated that handling of the projector is rendered easy and the cartridge and the supporting plate therefor can be arranged at locations adjacent the film gate plate 8, enabling the projector to be compact in size as a whole.

Although the present invention has been described and illustrated with reference to a preferred embodiment thereof, it is to be understood that the present invention is not restricted only to the embodiment shown by many changes and modification are possible to the details thereof within the scope of the principle of this invention.

I claim:

1. A cartridge-type motion-picture projector comprising a frame, a cartridge supporting plate having a forward nonoperative position and a backward operative position, a film gate fixed to said frame having an aperture with its centerline parallel to said path of movement of said cartridge supporting plate, a light source on said frame projecting light in a general direction transversely of said path of movement to a location rearwardly disposed relative to said film gate, a mirror pivotally mounted on said frame for pivotal movement between an operative and nonoperative position in which the said mirror is disposed in and without the path of travel of the plate respectively, said mirror being biased in said operative position such that the forward end of said plate upon being displaced from said backward operative position to said forward nonoperative position contacts said mirror to automatically pivot the latter from its operative to its inoperative position, said forward edge of said plate upon the latter being displaced from said forward nonoperative position to said backward position being displaced from contact with said mirror whereby the latter is pivoted to said operative position by said bias.

2. A cartridge-type motion-picture projector as set forth in claim 1 wherein said film gate has a stop lug to define the operative position of said mirror, and further said cartridge supporting plate is so arranged that when it is moved from its backward operative position to the forward nonoperative position, said forward edge engages the backside of said mirror thereby pivoting the latter into the nonoperative position thereof.